United States Patent
Tanimura

(10) Patent No.: US 8,893,509 B2
(45) Date of Patent: Nov. 25, 2014

(54) GAS TURBINE ENGINE WITH COOLING ARRANGEMENT

(75) Inventor: Kazuhiko Tanimura, Akashi (JP)

(73) Assignee: Kawasaki Jukogyo Kabushiki Kaisha, Kobe-shi ( * ) Notice: Subject to any disclaimer, the term of this patent is extended or adjusted under 35 U.S.C. 154(b) by 964 days.

(21) Appl. No.: 12/967,582

(22) Filed: Dec. 14, 2010

(65) Prior Publication Data

US 2011/0138819 A1    Jun. 16, 2011

(30) Foreign Application Priority Data

Dec. 15, 2009    (JP) .................................. 2009-284131

(51) Int. Cl.
*F02C 6/04*    (2006.01)
*F02C 7/18*    (2006.01)
*F01D 25/30*    (2006.01)

(52) U.S. Cl.
CPC . *F01D 25/30* (2013.01); *F02C 7/18* (2013.01); *F05D 2260/205* (2013.01); *F05D 2260/601* (2013.01)
USPC .............................................. 60/785; 60/806

(58) Field of Classification Search
USPC .......................................... 60/782, 785, 806
See application file for complete search history.

(56) References Cited

U.S. PATENT DOCUMENTS

| | | | |
|---|---|---|---|
| 2,479,573 A | 8/1949 | Howard | |
| 3,631,672 A | 1/1972 | Gentile | |
| 5,287,694 A | 2/1994 | Davis et al. | |
| 5,581,996 A * | 12/1996 | Koch et al. | 60/782 |
| 6,412,270 B1 * | 7/2002 | Mortzheim et al. | 60/782 |
| 6,487,863 B1 * | 12/2002 | Chen et al. | 60/782 |
| 6,782,703 B2 * | 8/2004 | Dovali-Solis | 60/785 |
| 7,698,898 B2 * | 4/2010 | Eluripati et al. | 60/785 |
| 7,743,613 B2 * | 6/2010 | Lee et al. | 60/782 |
| 8,726,672 B2 * | 5/2014 | Ciofini et al. | 60/782 |
| 2003/0046938 A1 * | 3/2003 | Mortzheim et al. | 60/782 |

(Continued)

FOREIGN PATENT DOCUMENTS

| | | |
|---|---|---|
| CH | 512 644 | 9/1979 |
| DE | 768 041 | 5/1955 |

(Continued)

OTHER PUBLICATIONS

Notification of Reason(s) for Refusal dated Sep. 27, 2011 in Japanese Application No. 2009-284131 (with translation).

(Continued)

*Primary Examiner* — William H Rodriguez
(74) *Attorney, Agent, or Firm* — Studebaker & Brackett PC

(57) ABSTRACT

A gas turbine engine has an exhaust diffuser. A first path extends radially through the outer and inner cones of the diffuser and has a radially inward end and a radially outward end, the inward end fluidly connected to the central cavity. An air supply or ejector is fluidly connected to the radially outward end of the first path, for drawing air by using the compressed air through the first path into the central cavity. A first opening is defined in the inner cone to fluidly connect between the exhaust channel and the central cavity. The first path and the first opening are so positioned that the cooling air is delivered from the air supply through the first path, the central cavity, and the first opening into the exhaust channel as it makes thermal contact with an object positioned in the central cavity to cool the object.

7 Claims, 5 Drawing Sheets

(56) References Cited

U.S. PATENT DOCUMENTS

2007/0125092 A1 6/2007 Wolfe et al.
2010/0322759 A1 12/2010 Tanioka
2013/0219918 A1* 8/2013 Suciu et al. .................... 60/782

FOREIGN PATENT DOCUMENTS

| EP | 1 512 844 A2 | 3/2005 |
| EP | 1 795 710 A2 | 6/2007 |
| JP | A-59-173527 | 10/1984 |
| JP | A-9-250361 | 9/1997 |
| JP | A-2004-197696 | 7/2004 |
| JP | A-2007-154897 | 6/2007 |
| JP | A-2009-167800 | 7/2009 |
| WO | WO 2009/087847 A1 | 7/2009 |

OTHER PUBLICATIONS

European Search Report dated Sep. 1, 2011 in European Application 10 194 877.6.

* cited by examiner

GAS TURBINE ENGINE WITH COOLING ARRANGEMENT

FIELD OF THE INVENTION

The present invention relates to a gas turbine engine. In particular, the present invention relates to a gas turbine engine having an exhaust diffuser made of inner and outer conical tubes coaxially arranged to define an annular exhaust channel therebetween and a cooling arrangement for cooling an element disposed in a cavity surrounded by the inner cone.

BACKGROUND OF THE INVENTION

There has been proposed a gas turbine engine having an exhaust diffuser for guiding exhaust air or combustion gas from the turbine. Typically, the diffuser has a double cone structure made of an inner cone, and an outer cone arranged coaxially with the inner cone to define an annular exhaust channel between the inner and outer cones (see, for example, JP 2004-197696 A). The exhaust channel is fluidly connected to the downstream end of the annular turbine channel, so that the combustion gas from the turbine channel is guided through the exhaust channel into the atmosphere.

The exhaust combustion gas has a high-temperature. This requires a suitable cooling arrangement for protecting molded structural components, such as supporting components or bearing box, disposed within a central cavity surrounded by the inner cone from being thermally affected by the high-temperature exhaust air.

Accordingly, a purpose of the invention is to provide a highly reliable gas turbine engine in which the structural component or components mounted within the central cavity surrounded and defined by the exhaust diffuser are cooled effectively.

SUMMARY OF THE INVENTION

In order to achieve the foregoing object, the present invention provides an improved gas turbine engine. The gas turbine engine has a compressor for compressing air to generate compressed air, a combustor for combusting fuel with the compressed air to generate combustion gas, a turbine supported for rotation about an axis so that it is driven to rotate by the contact with the combustion gas, and an exhaust diffuser having inner and outer cones both arranged coaxially with the axis to define an annular exhaust channel there between and a central cavity within the inner cone. A first path is provided to extend radially through the outer and inner cones. The first path has a radially inward end and a radially outward end and the inward end is fluidly connected to the central cavity. An air supply is fluidly connected to the radially outward end of the first path, for supplying cooling air through the first path into the central cavity. An air supply is fluidly connected to the radially outward end of the first path, for drawing air by using the compressed air through the first path into the central cavity. A first opening is defined in the inner cone to fluidly connect between the exhaust channel and the central cavity. The first path and the first opening are so positioned that the cooling air is delivered from the air supply through the first path, the central cavity, and the first opening into the exhaust channel as it makes thermal contact with an object positioned in the central cavity to cool the object.

According to the invention, by using the compressed air generated by the compressor, a large amount of air for cooling can be drawn into the central cavity and therefore the object in the central cavity is cooled so effectively.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following descriptions of the preferred embodiments are merely exemplary in nature and are in no way intended to limit the invention, its application, or uses.

Hereinafter, preferred embodiments of the present invention will be described with reference to the accompanying drawings.

Figure 1:
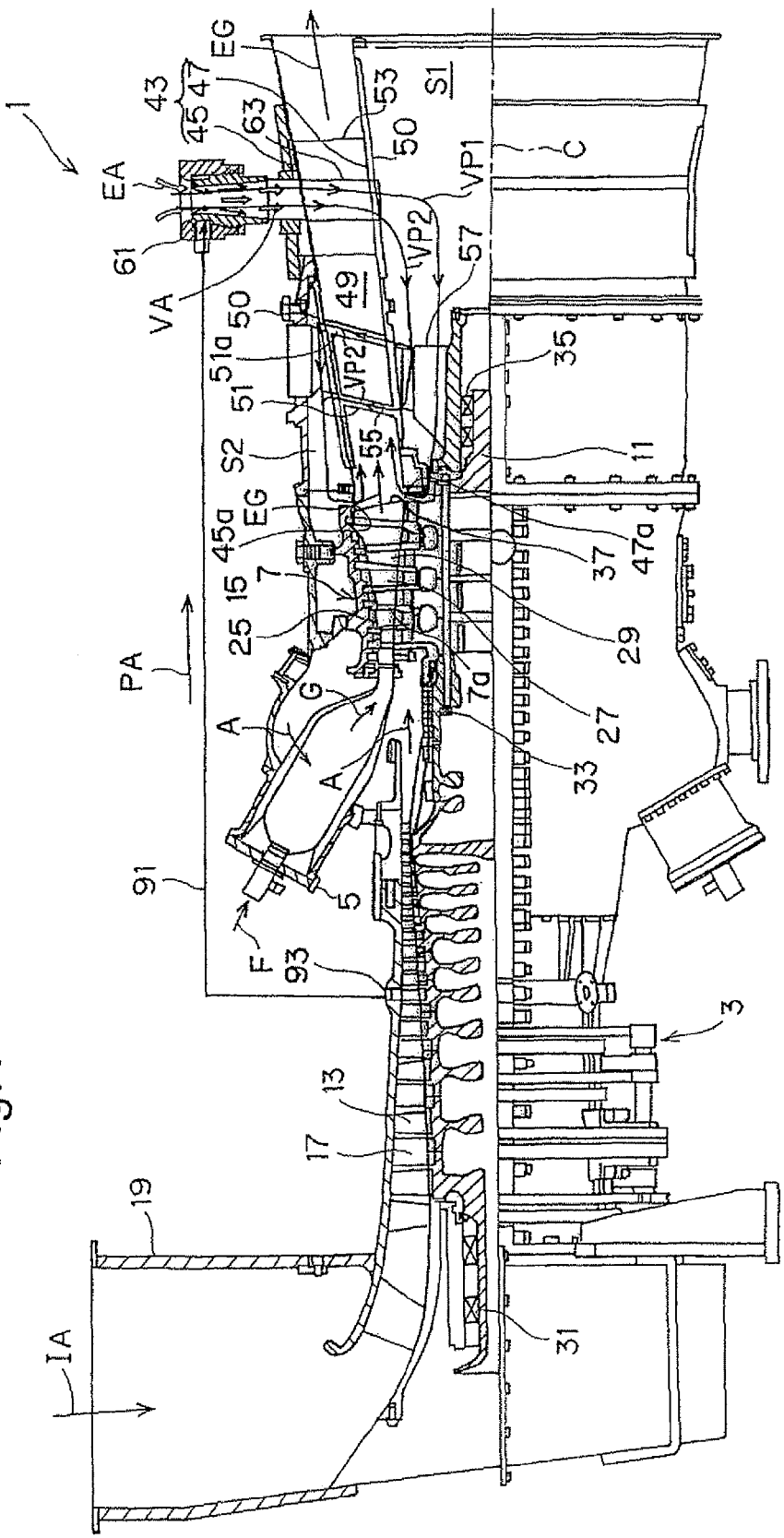
FIG. 1 is a partially broken-away side elevation of a gas turbine engine according to a first embodiment of the invention.

FIG. 1 shows a partially broken-away side elevation of a gas turbine engine (hereinafter referred to as "engine") generally indicated by reference numeral 1 according to the first embodiment of the invention. In the drawing, the engine 1 has a compressor 3 for compressing intake air IA to generate high-pressure compressed air, a plurality of combustors 5 for combusting fuel F injected therein with the compressed air to generate high-pressure and high-temperature combustion gas G, and a turbine 7 designed to be driven to rotate by impingements with the combustion gas G. Hereinafter, the left side of the engine on the drawing, adjacent to the compressor, is referred to as "upstream" or "front" side and the right side of the engine adjacent to the turbine is referred to as "downstream" or "rear" side, as necessary.

In the exemplary embodiment, although an axial-flow compressor is used for the compressor 3, another compressor such as centrifugal compressor may be used instead. The axial flow compressor 3 has a number of rotating blades 13 securely mounted on a front outer circumferential surface of a rotating shaft or rotor 11 of the engine 1. Also, an outer housing 15 surrounding the compressor 3 has a number of stationary vanes 17 securely mounted on a front inner circumferential surface opposing and surrounding the outer circumferential surface of the rotor 11. As is known to the art, the rotating blades 13 and the stationary vanes 17 are so combined that, when rotating the rotor 11, they cooperate with each other to draw the intake air IA from an inlet duct 19 and compress it to generate the compressed air.

The compressed air A is then delivered to the combustors 5 disposed at regular intervals around the central axis C of the engine 1. Each of the combustors 5 is designed to combust fuel F injected into the associated combustion chamber of the combustor with the compressed air A from the compressor 3 to generate high-temperature and high-pressure combustion gas G.

The high-temperature and high-pressure combustion gas G is delivered to the turbine 7. The turbine 7 has an inner housing or casing 25 provided inside the outer housing 15 for covering a rear part of the rotor 11 to define a turbine channel 7a between the casing 25 and the rotor 11. The inner circumferential surface of the casing 25 supports a number of stationary vanes 27 securely mounted thereon. The rear part of the rotor 11 has a number of rotating blades 29 securely mounted thereon. The vanes 27 and the blades 29 are positioned alternately in the axial direction. The rotor 11 so constructed is supported for rotation relative to the housing 15 about the rotational axis or central axis C, by front and rear bearings 31 and 35.

A rear end annular opening 37 of the turbine channel 7a, defined adjacent to the final stage rotating blades 29 and at the downstream end of the turbine 7, is fluidly connected to an annular exhaust diffuser 43 for guiding the exhaust gas EG from the turbine 7 into the atmosphere. The exhaust diffuser 43 has an outer cone 45, an inner cone 47 disposed within the outer cone 45 in a coaxial manner with the outer cone 45 to define an annular exhaust channel 49 there between for guiding the exhaust gas EG to the atmosphere, and a plurality of connecting members 51 and 53 extending radially between the outer and inner cones 45 and 47 to maintain the exhaust channel 49 (see FIG. 4). Preferably, the connecting members 51 and 53 are provided at regular circumferential intervals. The outer cone 45 is supported by the housing 15.

Each of the connecting members 51, which is made of a hollow tube, is opened at its inner and outer ends to the central cavity S1 defined within the inner cone 47 and the peripheral cavity S2 defined between the outer cylinder 47 and the housing 15, respectively, to define a fluid path (second path) 51a fluidly connecting between the central cavity S1 and the peripheral cavity S2. Although each of the connecting members 53 is also made of a hollow tube, it is closed at its opposite ends by the outer and inner cones 45 and 47.

Figure 4:
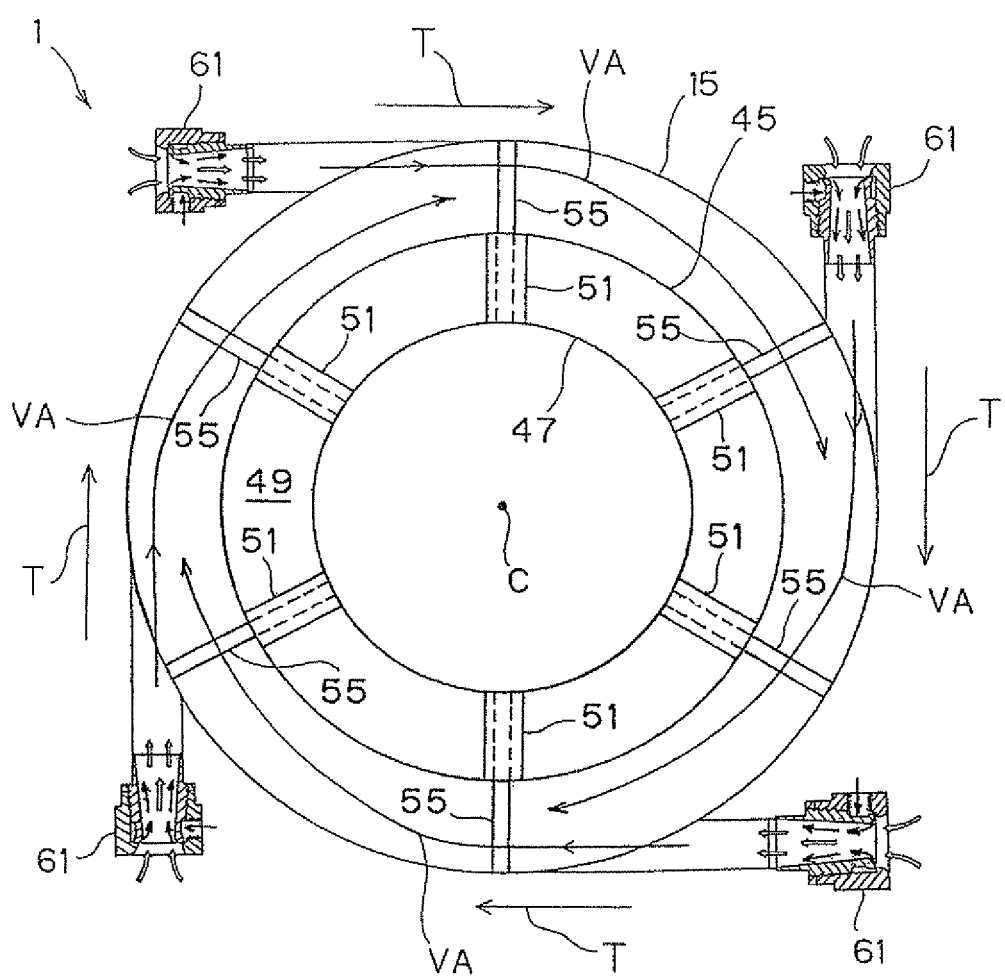
FIG. 4 is a cross section taken-along lines IV-IV in FIG. 3.

Preferably, as shown in FIG. 4, six connecting members 51 and 53 are provided at regular intervals in the circumferential direction. Although not limited thereto, the outer and inner cones 45 and 47 are manufactured using one or more heat-resistant metal plate. Preferably, the outer circumferential surface of the outer cone 45 and/or the inner circumferential surface of the inner cone 47 is at least in part covered by heat insulating material such as glass wool. Although not shown, a waste heat boiler may be provided on the downstream side of the exhaust diffuser 43, which is driven by the use of residual heat of exhaust gas EG.

The upstream end of the outer cone 45 is connected to and supported by the opposed downstream end portion of the inner casing 25. Either the upstream end portion of the outer cylinder 45 or the downstream end portion of the casing 25 has a plurality of openings (second openings) 45a formed at regular intervals along the circumferential connection between the outer cone 45 and the inner casing 25 for fluidly connecting between the outside and inside cavities of the outer cone 45, i.e., the peripheral cavity S2 and the exhaust channel 49.

The upstream end of the inner cone 47, on the other hand, is spaced away from the opposed rotor portion to define a circumferential gap or opening (first opening) 47a for fluidly connecting between the outside and inside cavities of the inner cone 47, i.e., the exhaust channel 49 and the central cavity S1.

Preferably, each of the radially extending hollow connecting members 51 and 53 is manufactured from a metal plate so that it has an ellipsoidal cross section with its major axis oriented in a direction parallel to the central axis and its minor axis oriented in the circumferential direction around the central axis.

In order to support a rear bearing 35 which bears the rear portion of the rotor 11 within the central cavity S1, radial struts 55 are extended through the interiors of the hollow connecting members 51. One ends or radially outermost ends of the struts 55 are connected to the outer housing 15 and the other ends or radially innermost ends thereof are connected to a bearing support 57 provided in the central cavity S1 for supporting the rear bearing 35.

As can be seen from FIG. 1, the cross section of the strut 55 is designed to be sufficiently smaller than that of the interior of the hollow connecting member 51 for leaving a space for fluidly connecting between the peripheral cavity S2 and the central cavity S1 through the path 51a.

For the connecting members 53, on the other hand, hollow ducts (first paths) 63 are provided to extend through the connecting members 53. As shown in the drawing, one ends or innermost ends of the duct 63 are opened to the central cavity S1 and the other or outermost ends thereof are extended through the outer cone 45 into the peripheral cavity S1 or through the outer cone 45 and the housing 15 into the atmosphere where they are fluidly connected to cooling air supply means or ejectors 61 securely mounted on the housing 15. The ejector 61 has inlet and outlet ports and a motive fluid nozzle. The inlet is opened to the atmosphere. The outlet is connected to the associated duct 63. The motive fluid nozzle is fluidly connected to the compressor 3 so that a part of the compressed air PA is extracted from the compressor 3 and then ejected from the motive fluid nozzle.

Figure 2:
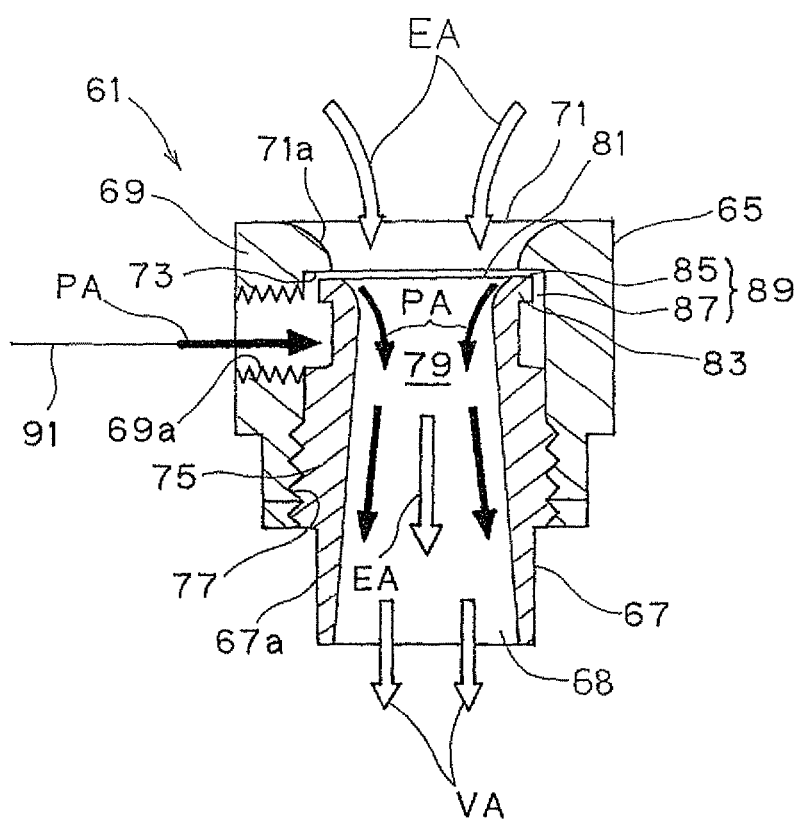
FIG. 2 is a cross section of an ejector incorporated in the gas turbine engine in FIG. 1.

According to an exemplary embodiment shown in FIG. 2, the ejector 61 has an outer cylindrical body 65 and an inner cylindrical nozzle 67 engaged in the outer body 65 from one end (bottom end in the drawing) thereof. The body 65 has a cylindrical peripheral wall 69. The peripheral wall 69 has a motive fluid nozzle or secondary inlet aperture 69a extending radially therethrough for introducing the compressed air PA. Preferably, the inlet or opening 71 is defined at the other end (top end in the drawing) of the body 65 by a wall surface 71a in the form of inwardly tapered, bell-mouth for introducing environmental air EA therethrough. The tapered wall surface 71a terminates adjacent the motive aperture 69a and protrudes radially inwardly from the inner end of the aperture 69a, which allows the body 65 to have an annular flange surface 73 between adjacent inlet aperture 69a and tapered wall surface 71a.

In the exemplary embodiment, although not limited thereto, the nozzle 67 has male threads 75 defined in the outer peripheral wall 67a thereof and the body 65 has associated female threads 77 defined in the inner peripheral wall, which allows that the nozzle 67 is connected to the body 65 with the male threads 75 engaged with the associated female threads 77. Preferably, the upper inner peripheral wall surface of the nozzle 67 is inversely tapered in the form of bell-mouth to form an inlet opening 81 for smoothly guiding the air EA from the inlet 71 toward a central path 79 defined within the nozzle 67. Also, the nozzle 67 has a radially outwardly extending annular flange 83 defined at a portion adjacent the inlet opening 81. An outer diameter of the annular flange 83 is larger than the inner diameter of the annular flange surface 73 and smaller than the inner diameter of the body 65 to define an annular gap 87 between the peripheral surface of the annular flange 83 and the opposed inner peripheral surface of the body 65.

The nozzle 67 is assembled with the body 65 so as to form a small gap 85 between the flange surface 73 of the body 65 and the opposed annular end surface (top end surface in the drawing). The gaps 85 and 87 between the body 65 and the nozzle 67 cooperate with each other to form an ejection path 89 for ejecting the compressed air PA supplied from the aperture 69a into the central path 79. Further, the central path 79 is inversely tapered toward the outlet (lower end opening in the drawing) 68 of the nozzle 67. Furthermore, although not shown, an annular deflection wall is provided adjacent the annular gap 85 so that it deflects the ejected compressed air PA toward the lower peripheral regions of the central path 79.

In operation, the compressed air PA is ejected at high velocity from the ejection path 89 to flow in the peripheral regions of the central path 79, which causes Bernoulli effect to generate a large negative pressure at the central region of the path 79. The negative pressure at the central region effectively draws the low temperature environmental air EA into the path 79. The drawn low-temperature environmental air EA is mixed with the compressed air PA and the mixture thereof is supplied as cooling or ventilation air VA from the outlet 68 through the duct 63 into the inner cavity S1 as indicated by arrows VP1 and VP2.

As shown in FIG. 1, the secondary inlet 69a of the ejector body 65 is fluidly connected through a path 91 to an extraction hole 93 formed in a housing portion surrounding the compressor 3. It is desirable to ventilate by low pressure and a small amount of bleed air, considering the influence on the engine performance though it is effective that the pressure as possible of the extracted air is as high since ambient air EA is draw in to ejector 61. In order to attain a required cooling effect, it is preferably that a temperature of the extracted air is as low as possible.

With the arrangements shown in FIG. 1, the cooling or ventilation air VA drawn into the ejector 61 is supplied through the duct 63 into the inner cavity S1 where it brings into thermal contact with an object to be cooled, for example, the bearing support 57, to draw heat therefrom. A part of the ventilation air VA in the inner cavity S1 is delivered, along the flow path VP1, through the opening 47a between the forward end of the inner cylinder 47 and the final stage rotating blades 29 into the exhaust channel 49. Another part of the air VA in the inner cavity S1 is delivered, along the flow path VP2, through the paths 51a between the first connecting members 51 and the struts 55 inserted therein, the outer cavity S2 between the housing 15 and the outer cylinder 45, and the openings 45a between the forward end of the outer cylinder 45 and the rearward end of the turbine casing 25 into the exhaust channel 49.

As described above, the first and second paths VP1 and VP2 are in part defined by the openings defined at or between the rearward end of the turbine and the forward end of the exhaust diffuser 43. This arrangement allows that the ventilation air VA is drawn into the exhaust channel 49 because of the high-speed exhaust gas EG flowing from the turbine 7 into the exhaust channel 49, which enhances the drawing of the air VA into the central cavity S1 and thereby to attain the effective cooling of the object.

Although the openings between the outer and inner cavities S1 and S2 and the exhaust channel 49 are positioned at the forward ends of the outer and inner cones 45 and 47, they may be positioned away from the forward ends of the cylinders.

According to the gas turbine engine 1 so constructed, the compressed air PA from the compressor 3 is delivered into the ejector 61 and, with an aid of the high-speed flow of the compressed air, a large amount of low temperature environmental air EA is effectively drawn through the ejector 61 into the central cavity S1 and delivered along the paths VP1 and VP2, which in turn causes the object within the inner cavity to be effectively and reliably cooled.

Although in the previous embodiment the bearing support 57 is cooled by the contact with the environmental air flowing along the paths VP1 and VP2, the object to be cooled is not limited thereto and another component or components of, for example, lubrication and/or measurement system may be cooled additionally, or instead. In particular, an effective cooling of the large support structure ensures to reduce the usage of expensive heat resistance material and, as a result, reduce the product cost.

The installation site of the ejector 61 is not limited to that shown in FIG. 1. For example, according to the second embodiment shown in FIG. 3, the ejector may be placed on the upstream side of the first connecting member 51. In this embodiment, a part of the air fed through the paths 51a between the connecting members 51 and the struts 55 into the inner cavity S1 is delivered, along a path VP3, through the inner opening 47a into the exhaust path 49. Also, another part of the environmental air EA is delivered from the inner cavity S1 through the duct 63 into the atmosphere.

Figure 3:
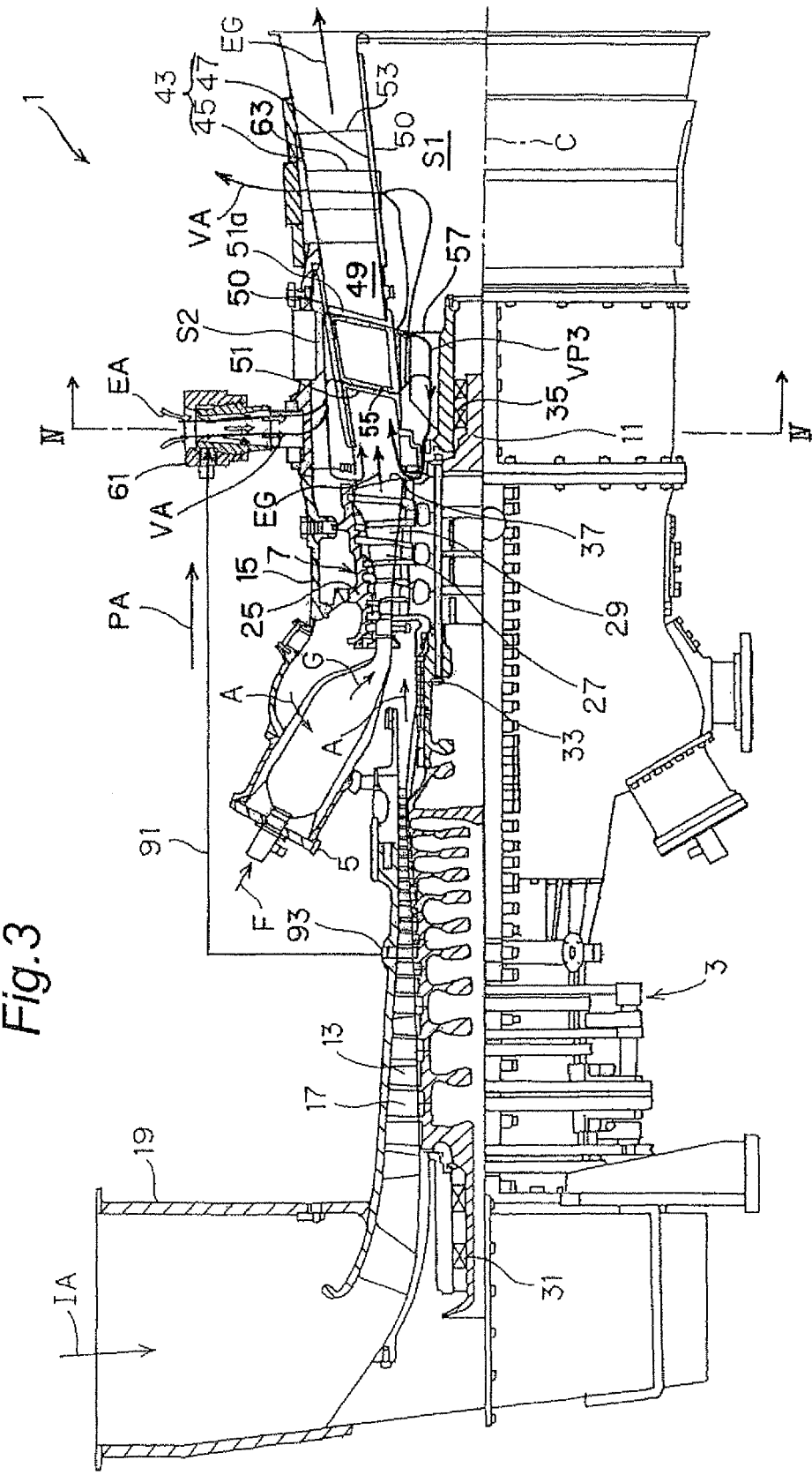
FIG. 3 is a partially broken-away side elevation of a gas turbine engine according to a second embodiment of the invention.

FIG. 4 is a schematic cross sectional view taken along lines IV-IV in FIG. 3 in which some of the structural components within the inner cylindrical wall 47 are omitted from the drawing for clarity. As shown in the drawing, each of the ejectors 51 is connected to the outer cylindrical wall 45 so that the environmental air EA is ejected from the ejector 61 in a tangential direction T of a circle around the central axis C. This allows that the air VA circulates in a circumferential direction around the axis C and then flows into the ventilation paths 51a between the connecting members 51 and the struts 55, which ensures that the outer cylindrical wall 45 is effectively cooled by the contact with the ventilation air. In the embodiment, although four ejectors 61 are provided at regular intervals around the axis C, the number and/or the relative arrangement of the ejectors 61 and the connecting members 51 may be modified as necessary.

Figure 5:
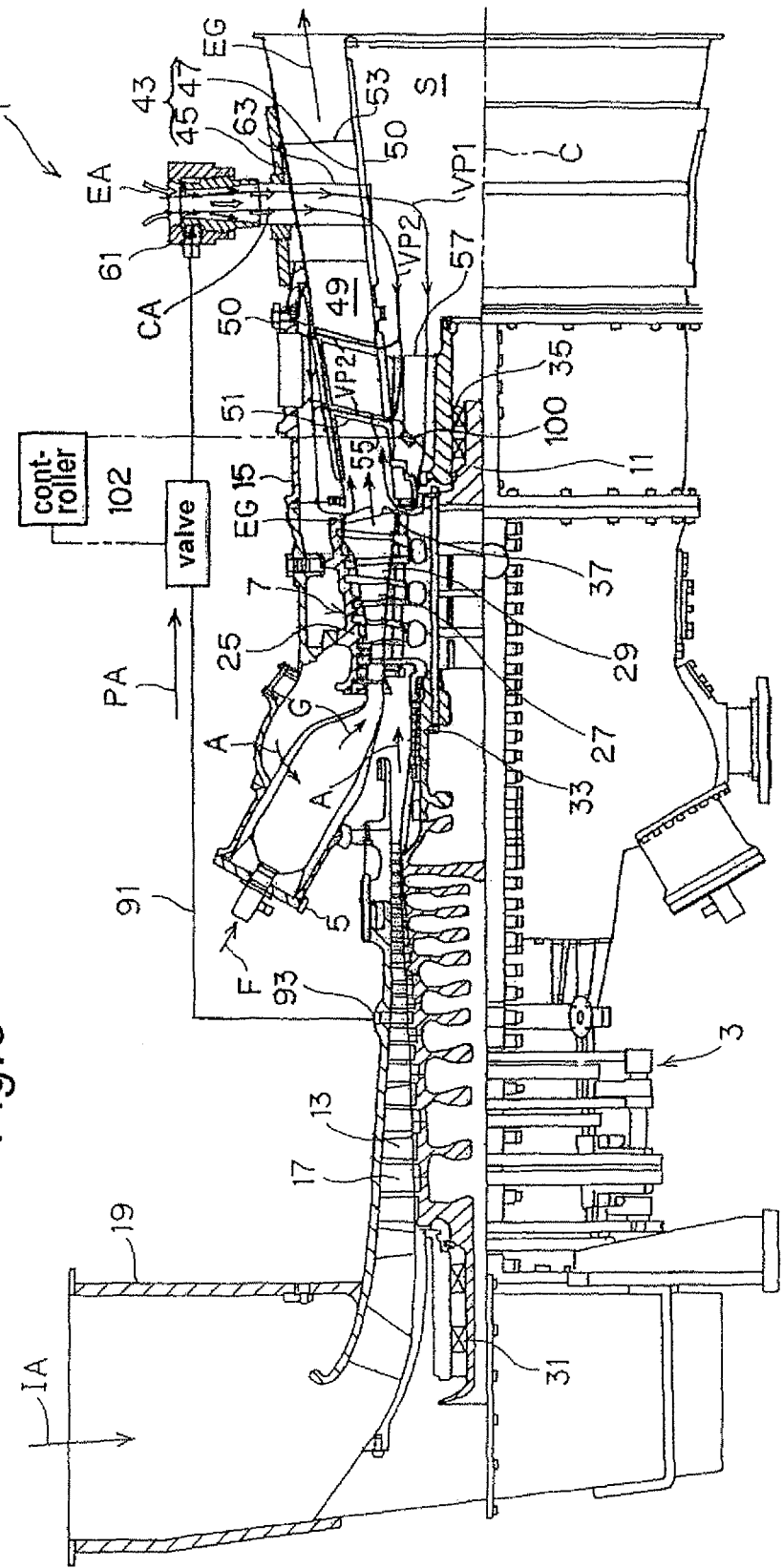
FIG. 5 is a partially broken away side elevation of a gas turbine engine according to a second embodiment of the invention.

FIG. 5 is a broken-away side elevation of the gas turbine engine 1 according to the third embodiment of the invention. In this embodiment, the object to be cooled, for example, the bearing support 57, is equipped with a temperature sensor 100 so that an amount of compressed air PA to be extracted from the compressor 3 is controlled depending upon the temperature detected by the sensor 100. To this end, a control valve 102 is provided on the path 91 between the compressor and the ejectors for delivering the compressed air to the ejectors. This allows that an opening ratio of the valve 102 is controlled on the basis of the output from the temperature sensor 100. In this control, for example, if the detected temperature of the cooling object has a relatively low temperature and therefore cooling is unlikely to be needed, the control valve 102 reduces the amount of compressed air being extracted. Contrarily, if the detected temperature is relatively high and therefore cooling is needed, the valve 102 increases the amount of compressed air being extracted.

Preferably, the temperature sensor 100 may be selected taking account of mounting space, required precision, and/or cost thereof. For various types of temperature sensors may be used, such as, thermocouple, thermistor, or platinum resistance element.

In view of foregoing, the compressed air PA is used effectively and the gas turbine engine is driven efficiently and reliably by controlling the flow rate of the compressed air PA from the compressor 3 in response to the temperature of the cooling object.

The description of the invention is merely exemplary in nature and, thus, variations that do not depart from the gist of the invention are intended to be within the scope of the invention. Such variations are not to be regarded as a departure from the spirit and scope of the invention.

For example, the ejector 61 is not limited to the type described with reference to the drawing and may be another type of conventional ejector.

What is claimed is:

1. A gas turbine engine comprising:
   a compressor for compressing air to generate compressed air;
   a combustor for combusting fuel with the compressed air to generate combustion gas;
   a turbine supported for rotation about an axis so that it is driven to rotate by the contact with the combustion gas;
   an exhaust diffuser having inner and outer tubes both arranged coaxially with the axis to define an annular exhaust channel therebetween and a central cavity within the inner tube;
   a first passage extending radially through the outer and inner tubes, the first passage having a radially inward end and a radially outward end, the inward end being fluidly connected to the central cavity;
   an air supply having an ejector positioned at the radially outward end of the first passage for drawing environmental air into the first passage and a path fluidly connecting the compressor to the ejector for delivering the compressed air through the first passage into the central cavity such that said ejector mixes the environmental air with the compressed air to generate a cooling air; and
   a first opening defined in the inner tube to fluidly connect between the exhaust channel and the central cavity, the first passage and the first opening being so positioned that the cooling air is delivered from the air supply through the first passage, the central cavity, and the first opening into the exhaust channel as the cooling air makes thermal contact with an object positioned in the central cavity to cool the object.

2. The gas turbine engine of claim 1, further comprising a first hollow connecting member connecting between the inner and outer tubes and surrounding the first passage.

3. The gas turbine engine of claim 2, wherein the first hollow connecting member has an ellipsoidal cross section with a major axis oriented in a direction parallel to the axis and its minor axis oriented in a circumferential direction around the axis.

4. The gas turbine engine of claim 1, further comprising:
   a housing surrounding the outer tube to define a peripheral cavity between the housing and the outer tube;
   a second passage extending radially through the outer and the inner tubes and the exhaust channel to fluidly connecting between the central and the peripheral cavities; and
   a second opening fluidly connecting between the peripheral cavity and the exhaust channel;
   said second passage being positioned so that, after making the thermal contact with the object, a part of the cooling air in the central cavity is delivered through the second passage, the peripheral cavity and the second opening into the exhaust channel.

5. The gas turbine engine of claim 4, wherein the second opening is defined between the outer tube and the turbine.

6. The gas turbine engine of claim 4, wherein the second opening is defined in the outer tube.

7. The gas turbine engine of claim 4, further comprising a rotor for supporting the turbine for rotation about the axis;
   a bearing provided in the central cavity for bearing the rotor;
   a bearing support provided in the central cavity for supporting the bearing; and
   a strut extending through the second passage to connect between the housing and the bearing support, the strut having a cross section smaller than that of the second passage to allow the cooling air to move from the central cavity to the peripheral cavity through the second passage; wherein the bearing support is the object to be cooled by the thermal contact with the cooling air.

* * * * *